US011149714B2

(12) United States Patent
Perez-Santiago et al.

(10) Patent No.: US 11,149,714 B2
(45) Date of Patent: Oct. 19, 2021

(54) SYSTEM AND METHOD FOR OPTIMIZING AUXILIARY LOADS BASED ON OPERATIONAL USAGE

(71) Applicant: General Electric Company, Schenectady, NY (US)

(72) Inventors: Anthony Perez-Santiago, Greenville, SC (US); Hammad Ahmad, Laurens, SC (US); Devendra Shashikant Dange, Columbia, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/744,325

(22) Filed: Jan. 16, 2020

(65) Prior Publication Data

US 2021/0222675 A1 Jul. 22, 2021

(51) Int. Cl.
*F03D 7/04* (2006.01)
*H02J 3/38* (2006.01)
*F03D 7/02* (2006.01)

(52) U.S. Cl.
CPC ........... *F03D 7/048* (2013.01); *F03D 7/0284* (2013.01); *H02J 3/381* (2013.01); *H02J 2300/28* (2020.01)

(58) Field of Classification Search
CPC ........ F03D 7/048; F03D 7/0284; H02J 3/381; H02J 2300/28
See application file for complete search history.

(56) References Cited

U.S. PATENT DOCUMENTS

| | | |
|---|---|---|
| 8,674,536 B2 | 3/2014 | Eitan et al. |
| 8,841,796 B2 | 9/2014 | Rosenvard |
| 9,334,749 B2 | 5/2016 | Das et al. |
| 9,564,757 B2 | 2/2017 | Wang et al. |
| 9,644,612 B2 | 5/2017 | Evans et al. |
| 9,790,921 B2 | 10/2017 | Egedal et al. |
| 9,797,377 B2 | 10/2017 | Bhaskar et al. |
| 9,995,278 B2 | 6/2018 | Lund et al. |
| 10,100,813 B2 | 10/2018 | Ravindra et al. |
| 10,107,260 B2 | 10/2018 | Ritter et al. |
| 10,135,253 B2 | 11/2018 | Lof et al. |
| 10,161,386 B2 | 12/2018 | Timbus et al. |
| 2011/0175355 A1* | 7/2011 | Rosenvard ............... H02J 11/00 290/44 |
| 2013/0214534 A1* | 8/2013 | Nakamura .............. F03D 80/50 290/44 |
| 2017/0089325 A1* | 3/2017 | Timbus .................. F03D 7/0292 |
| 2020/0091855 A1* | 3/2020 | Pevear ...................... G06F 1/26 |

* cited by examiner

Primary Examiner — Sean Gugger
(74) Attorney, Agent, or Firm — Dority & Manning, P.A.

(57) ABSTRACT

A method for optimizing auxiliary loads of a wind farm having a plurality of wind turbines includes tracking, via a farm-level controller of the wind farm, operational usage for one or more auxiliary components of at least one of the wind turbines in the wind farm as the operational usage for the one or more auxiliary components induces a load on the auxiliary component(s). The method also includes determining, via the farm-level controller, a power consumption of the load induced on the one or more auxiliary components based on the operational usage. Further, the method includes receiving, via the farm-level controller, at least one additional parameter of the wind farm. Moreover, the method includes implementing, via the farm-level controller, a control command for one or more of the one or more auxiliary components based on the power consumption and the at least one additional parameter.

18 Claims, 5 Drawing Sheets

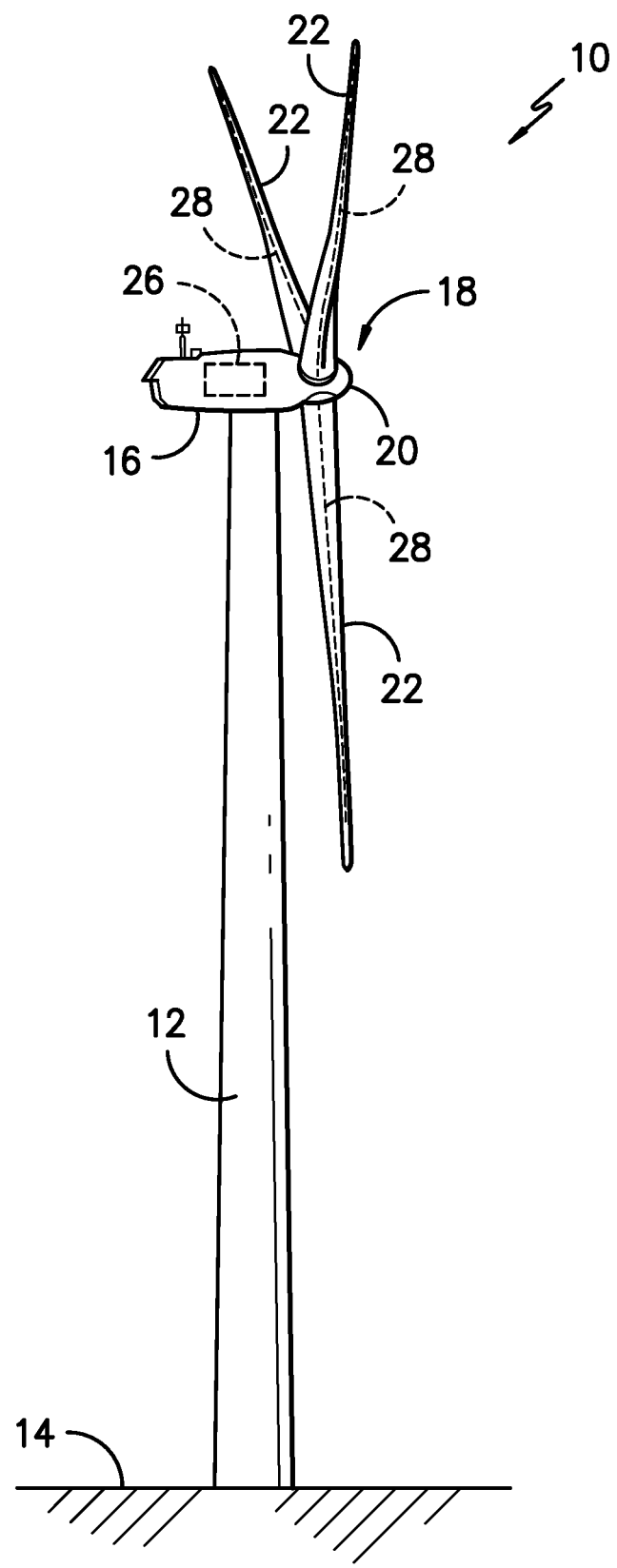
FIG. -1-

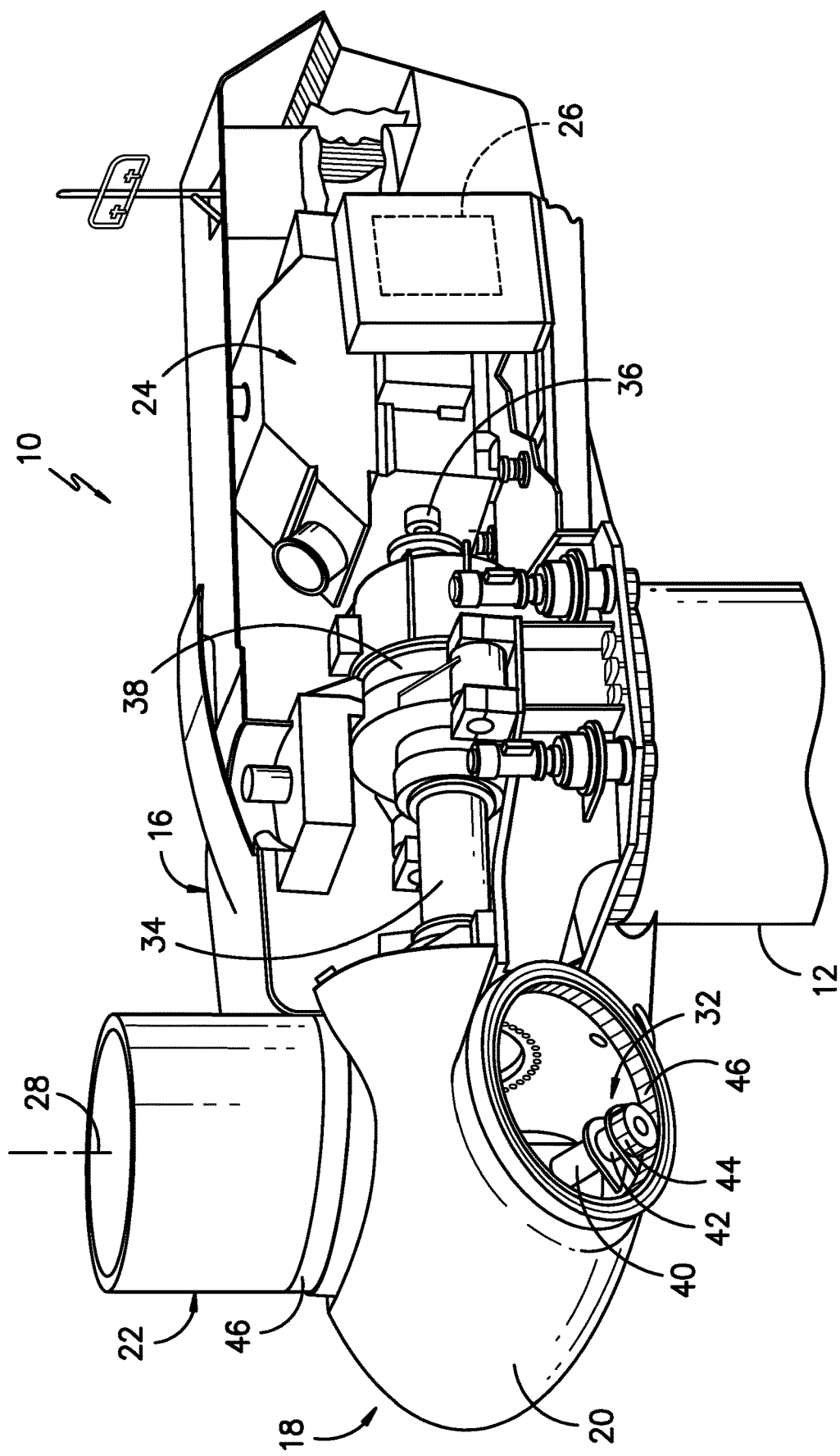
FIG. -2-

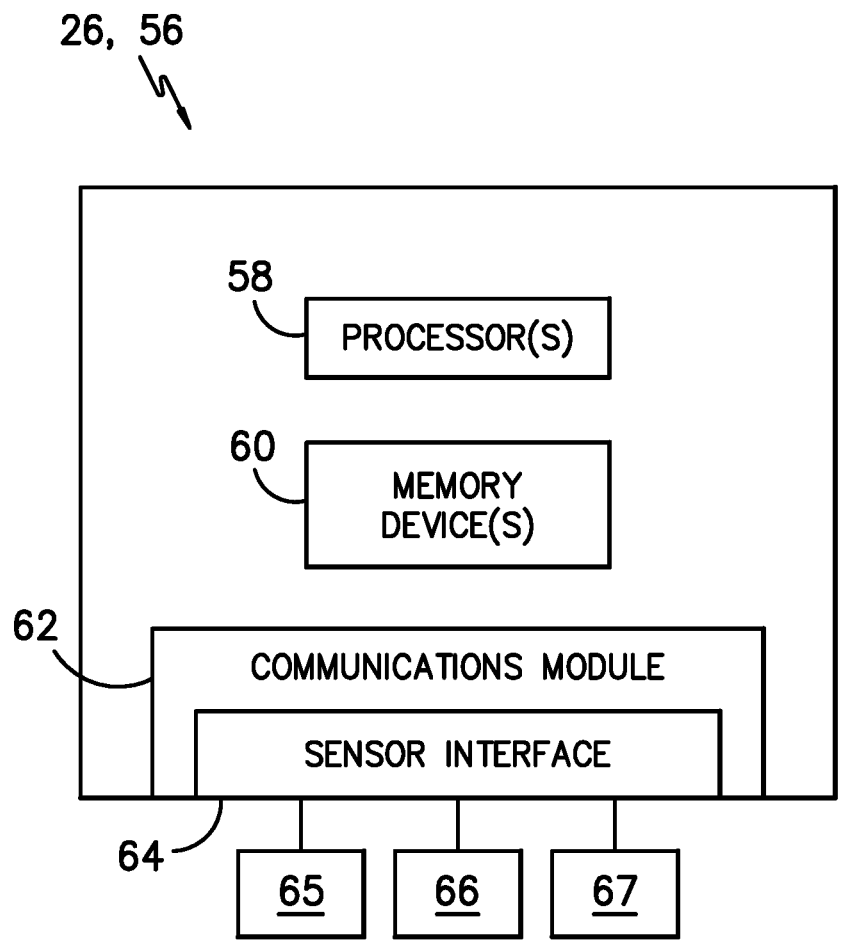
FIG. -3-

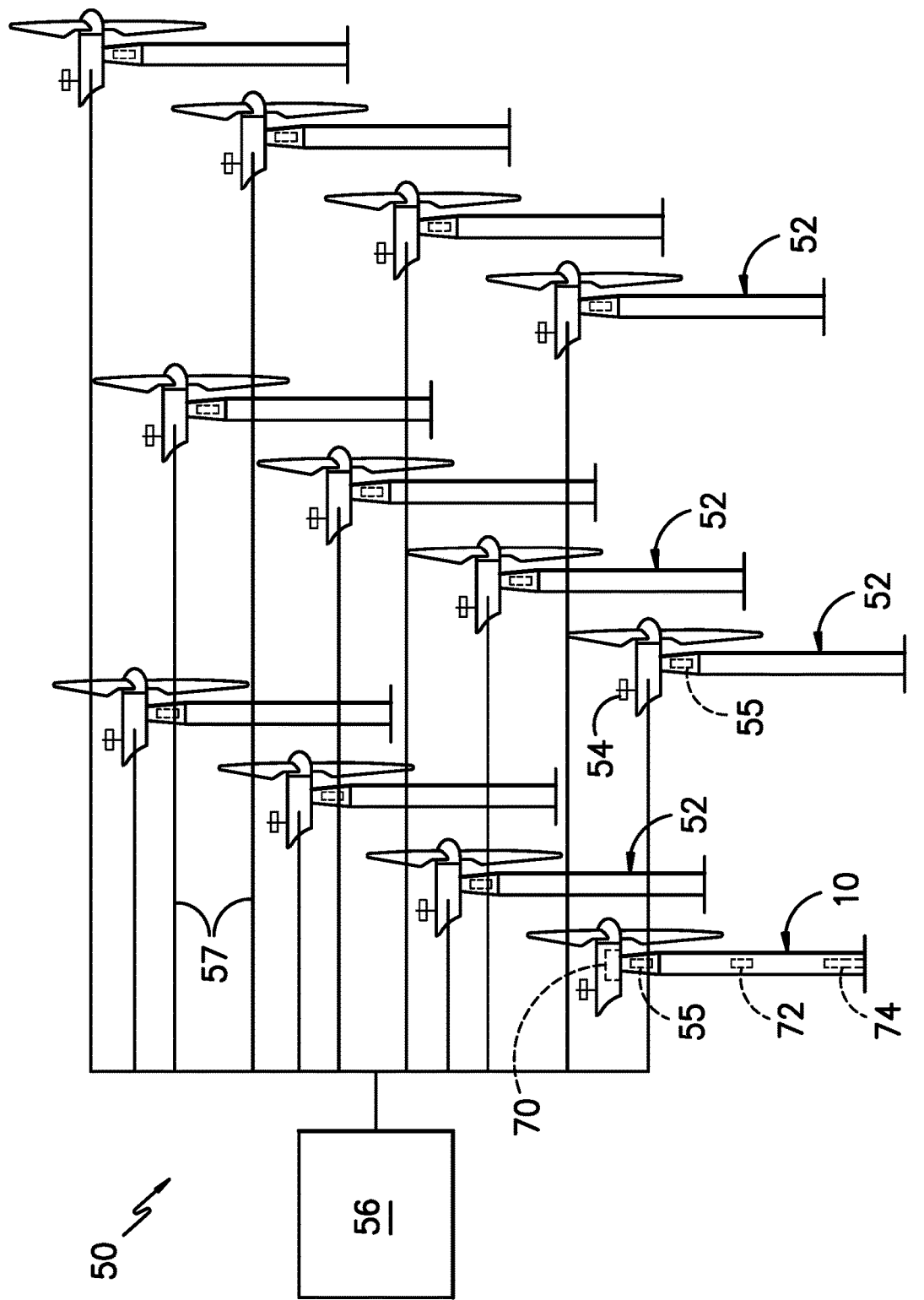

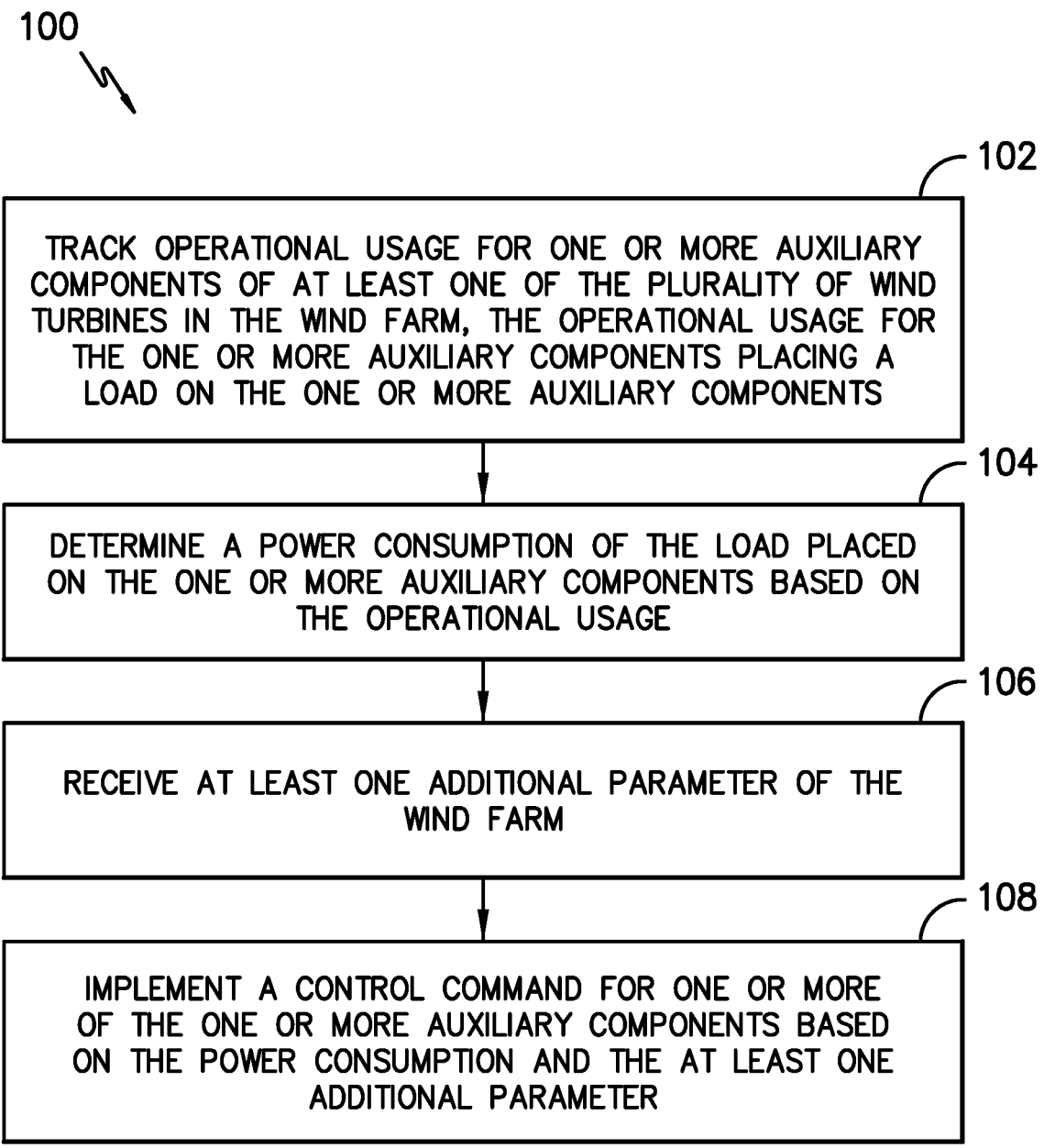
FIG. -5-

SYSTEM AND METHOD FOR OPTIMIZING AUXILIARY LOADS BASED ON OPERATIONAL USAGE

FIELD

The present disclosure relates generally to wind turbines and, more particularly, to a system and method for optimizing auxiliary loads based on operational usage.

BACKGROUND

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity.

Typically, wind turbines are designed to operate at a rated power output over a predetermined or anticipated operating life. For instance, a typical wind turbine is designed for a 20-year life. However, in many instances, this anticipated overall operating life is limited or based on the anticipated fatigue life of one or more of the wind turbine components. The life consumption or operational usage of the wind turbine (which can include fatigue or extreme loads, wear, and/or other life parameters) as used herein generally refers to the life of the wind turbine or its components that has been consumed or exhausted by previous operation. Furthermore, auxiliary loads also play an important role in a wind turbine as most of the functionalities and components' operation are powered through the auxiliary interface. For example, the total rated power of auxiliary loads generally represent about 3% or more of a wind turbine's rated power.

Thus, an improved system and method for tracking real-time operation of different kinds of loads can be beneficial for optimizing auxiliary loads. Accordingly, the present disclosure is directed to systems and methods for optimizing auxiliary loads based on tracked operational usage.

BRIEF DESCRIPTION

Aspects and advantages of the invention will be set forth in part in the following description, or may be obvious from the description, or may be learned through practice of the invention.

In one aspect, the present disclosure is directed to a method for optimizing auxiliary loads of a wind farm comprising a plurality of wind turbines. The method includes tracking, via a farm-level controller of the wind farm, operational usage for one or more auxiliary components of at least one of the wind turbines in the wind farm as the operational usage for the one or more auxiliary components induces a load on the auxiliary component(s). The method also includes determining, via the farm-level controller, a power consumption of the load induced on the one or more auxiliary components based on the operational usage. Further, the method includes receiving, via the farm-level controller, at least one additional parameter of the wind farm. Moreover, the method includes implementing, via the farm-level controller, a control command for one or more of the one or more auxiliary components based on the power consumption and the at least one additional parameter.

In an embodiment, the method may also include tracking the operational usage for the auxiliary component(s) in real-time online.

In another embodiment, determining the power consumption of the load induced on the auxiliary component(s) based on the operational usage may include tracking rising and falling control commands sent by the farm-level controller to the auxiliary component(s) and a rated power from a nameplate of the auxiliary component(s).

In further embodiments, the additional parameter(s) may include site location, spot price of wind energy, temperature, humidity, air pressure, wind speed, wind direction, or similar or combinations thereof.

In additional embodiments, the method may include tracking the spot price of the wind energy and reducing the load of one or more of the auxiliary component(s) and/or scheduling a maintenance action when the spot price is above a predetermined threshold.

In several embodiments, the auxiliary component(s) may include topbox auxiliary loads, converter auxiliary loads, and/or downtower auxiliary loads. More specifically, in such embodiments, the topbox auxiliary loads may include, for example, a yaw system, a pitch system, one or more pumps, a heating system, or a cooling system.

In particular embodiments, implementing the control command for one or more of the auxiliary component(s) based on the power consumption and the additional parameter(s) may include turning off one or more of the auxiliary component(s) for any of the plurality of wind turbines not producing power. In another embodiment, for example, turning off one or more of the auxiliary component(s) for any of the plurality of wind turbines not producing power may include turning off at least the topbox auxiliary loads for any of the plurality of wind turbines not producing power.

In further embodiments, implementing the control command for one or more of the auxiliary component(s) based on the power consumption and the additional parameter(s) may include reducing the load induced on the auxiliary component(s) when at least one of the plurality of wind turbines is operating at rated power.

In still another embodiment, if the load induced on the auxiliary component(s) deviates by a certain threshold, the method may include determining at least one operating condition at the deviated load, trending the operating condition(s) over time, and storing the trended operating condition(s) in a memory device for use in future designs of the wind farm.

In another aspect, the present disclosure is directed to a system for optimizing auxiliary loads of a wind turbine. The system includes a controller configured to implement a plurality of operations, including but not limited to tracking operational usage for one or more auxiliary components of the wind turbine, the operational usage for the auxiliary component(s) placing a load on the one or more auxiliary components, determining a power consumption of the load induced on the auxiliary component(s) based on the operational usage, receiving at least one additional parameter of the wind turbine, and implementing a control command for one or more of the auxiliary component(s) based on the power consumption and the additional parameter(s). It should be understood that the system may further be configured with any of the features described herein.

In yet another aspect, the present disclosure is directed to a method for optimizing power output a wind farm comprising a plurality of wind turbines. The method includes tracking, via a farm-level controller of the wind farm, operational usage for one or more auxiliary components of at least one of the plurality of wind turbines in the wind farm as the operational usage for the auxiliary component(s) induces a load on the auxiliary component(s). The method also includes determining, via the farm-level controller, a power consumption of the load induced on the auxiliary component(s) based on the operational usage. Further, the method includes implementing, via the farm-level controller, a control command for one or more of the auxiliary component(s) based on the power consumption. It should be understood that the method may further include any of the features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, explain the principles of the invention.

BRIEF DESCRIPTION OF THE DRAWINGS

A full and enabling disclosure of the present invention, including the best mode thereof, directed to one of ordinary skill in the art, is set forth in the specification, which refers to the appended figures, in which:

FIG. 1 illustrates a perspective view of one embodiment of a wind turbine according to the present disclosure;

FIG. 2 illustrates a simplified, internal view of one embodiment of a nacelle of a wind turbine according to the present disclosure;

FIG. 3 illustrates a schematic view of one embodiment of suitable components that may be included within a turbine controller of the wind turbine shown in FIG. 1;

FIG. 4 illustrates a wind farm having a plurality of wind turbines according to the present disclosure; and FIG. 5 illustrates a flow chart of one embodiment of a method for optimizing auxiliary loads of a wind farm comprising a plurality of wind turbines according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a flexible approach to optimizing auxiliary loads of a wind turbine and/or a wind farm. Most of the functionalities and wind turbine components' operation are powered through the auxiliary interface. Therefore, auxiliary loads can account for about 3% of the total rated power of a wind turbine. By implementing a tracking system to determine the real-time operation of the different loads, it is possible to optimize the auxiliary loads at a farm level. As such, in an embodiment, the control implementation can perform an online estimation of the time operation of each load, by tracking the amount of time that has passed after a rising or falling control command. This can play an important role in optimizing the performance of different sites by reducing the losses and improving the power output. Additionally, the systems and methods of the present disclosure can impact the way auxiliary loads are designed to meet the requirements, specially to meet the lifetime of the wind turbines.

Moreover, the systems and methods of the present disclosure produce a real-time diagnostic of the power consumption of the auxiliary loads. This diagnostic adds flexibility to the system and to help track all the power consumption from the loads during their lifetime. If one of the loads changes, the diagnostic feature can help determine the operating conditions of that load at any time. Such information can be retrofit back into the design phase for auxiliary loads to validate assumptions and help to improve new designs. Also, the collected data can be used to perform trade-off analysis that assists the system in understanding the impacts of auxiliary loads into the performance of the wind turbine and overall wind farm.

In addition, the systems and methods of the present disclosure allow for be real-time optimization. For example, in an embodiment, the present disclosure can compare the spot price and the weather forecast, e.g. using a computer-implemented model. By combining the spot price and the weather forecast, it is possible to optimize the auxiliary loads in a real-time based on weather and market conditions. Both features can also be implemented in a computer application to provide a user-friendly platform.

Referring now to the drawings, FIG. 1 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a corrective action. As such, the controller 26 may include a computer or other suitable processing unit. Thus, in several embodiments, the controller 26 may include suitable computer-readable instructions that, when implemented, configure the controller 26 to perform various functions, such as receiving, transmitting and/or executing wind turbine control signals.

Accordingly, the controller 26 may generally be configured to control the various operating modes of the wind turbine 10 (e.g., start-up or shut-down sequences), de-rate the wind turbine 10, and/or control various components of the wind turbine 10. For example, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10 by adjusting an angular position of at least one rotor blade 22 relative to the wind. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Referring now to FIG. 3, there is illustrated a block diagram of one embodiment of suitable components that may be included within a controller in accordance with aspects of the present disclosure. It should be understood that the various components of the controller of FIG. 3 may be applicable to any suitable controller, including for example, the controller 300 (which is described in more detail below with respect to FIGS. 7A, and 7B), the turbine controller 26, and/or the farm-level controller 56 described herein.

As shown, the controller may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Additionally, the controller may also include a communications module 62 to facilitate communications between the controller and the various components of the wind turbine 10. For instance, the communications module 62 may include a sensor interface 64 (e.g., one or more analog-to-digital converters) to permit the signals transmitted by one or more sensors 65, 66, 67 to be converted into signals that can be understood and processed by the controller. It should be appreciated that the sensors 65, 66, 67 may be communicatively coupled to the communications module 62 using any suitable means. For example, as shown in FIG. 3, the sensors 65, 66, 67 are coupled to the sensor interface 64 via a wired connection. However, in other embodiments, the sensors 65, 66, 67 may be coupled to the sensor interface 64 via a wireless connection, such as by using any suitable wireless communications protocol known in the art. As such, the processor 58 may be configured to receive one or more signals from the sensors 65, 66, 67.

The sensors 65, 66, 67 of the wind turbine 10 may be any suitable sensors configured to measure any operational condition and/or wind parameter at or near the wind turbine. For example, the sensors 65, 66, 67 may include blade sensors for measuring a pitch angle of one of the rotor blades 22 or for measuring a loading acting on one of the rotor blades 22; generator sensors for monitoring the generator (e.g. torque, rotational speed, acceleration and/or the power output); and/or various wind sensors for measuring various wind parameters. In addition, the sensors 65, 66, 67 may be located near the ground of the wind turbine, on the nacelle, or on a meteorological mast of the wind turbine.

It should also be understood that any other number or type of sensors may be employed and at any location. For example, the sensors may be analog sensors, digital sensors, optical/visual sensors, accelerometers, pressure sensors, angle of attack sensors, vibration sensors, MIMU sensors, fiber optic systems, temperature sensors, wind sensors, Sonic Detection and Ranging (SODAR) sensors, infra lasers, Light Detecting and Ranging (LIDAR) sensors, radiometers, pitot tubes, rawinsondes, and/or any other suitable sensors. It should be appreciated that, as used herein, the term "monitor" and variations thereof indicate that the various sensors of the wind turbine may be configured to provide a direct measurement of the parameters being monitored or an indirect measurement of such parameters. Thus, the sensors 65, 66, 67 may, for example, be used to generate signals relating to the parameter being monitored, which can then be utilized by the controller to determine the actual condition.

Referring now to FIG. 4, the system and method as described herein may also be combined with a wind farm controller 56 of a wind farm 50. As shown, the wind farm 50 may include a plurality of wind turbines 52, including the wind turbine 10 described above. For example, as shown in the illustrated embodiment, the wind farm 50 includes twelve wind turbines, including wind turbine 10. However, in other embodiments, the wind farm 50 may include any other number of wind turbines, such as less than twelve wind turbines or greater than twelve wind turbines. In one embodiment, the controller 26 of wind turbine 10 may be communicatively coupled to the farm controller 56 through a wired connection, such as by connecting the controller 26 through suitable communicative links 57 (e.g., a suitable cable). Alternatively, the controller 26 may be communicatively coupled to the farm controller 56 through a wireless connection, such as by using any suitable wireless communications protocol known in the art.

In several embodiments, one or more of the wind turbines 52 in the wind farm 50 may include a plurality of sensors for monitoring various operating parameters/conditions of the wind turbines 52. For example, as shown, one of the wind turbines 52 includes a wind sensor 54, such as an anemometer or any other suitable device, configured for measuring wind speeds. As is generally understood, wind speeds may vary significantly across a wind farm 50. Thus, the wind sensor(s) 54 may allow for the local wind speed at each wind turbine 52 to be monitored. In addition, the wind turbine 52 may also include an additional sensor 55. For instance, the sensors 55 may be configured to monitor electrical properties of the output of the generator of each wind turbine 52, such as current sensors, voltage sensors, temperature sensors, or power monitors that monitor power output directly based on current and voltage measurements. Alternatively, the sensors 55 may include any other sensors that may be utilized to monitor the power output of a wind turbine 52. It should also be understood that the wind turbines 52 in the wind farm 50 may include any other suitable sensor known in the art for measuring and/or monitoring wind conditions and/or wind turbine conditions.

Furthermore, each of the wind turbines 52 in the wind farm 50 may include various auxiliary components/equipment such as pumps, blowers, motors, cooling systems, heating systems, etc. that generate auxiliary loads and therefore consume power. Such auxiliary components are typically divided between multiple cabinets of the wind turbines 52. For example, as shown in FIG. 4, the auxiliary components may be housed in a topbox cabinet 70, a converter cabinet 72, a downtower cabinet 74, or any other suitable cabinet at any suitable location.

The total amount of power that such auxiliary loads represent can account for as much as about 3% or more of the rating power for the individual wind turbines 52. Further, many of these loads come directly from the topbox cabinet 70, which can represent about 80% of the total auxiliary power of the wind turbines 52 (or about 2% of the entire turbine rated power). The topbox cabinet 70 typically contains critical loads such as the yaw and pitch systems and other loads like heaters and pump systems. Accordingly, the critical loads of the topbox cabinet 70 represent about 60-65% of all of the auxiliary loads (or about 1.5% of the entire turbine rating).

Thus, referring now to FIG. 5, a flow diagram of one embodiment of a method 100 for optimizing the auxiliary loads of a wind farm, such as wind farm 50, is illustrated in accordance with aspects of the present disclosure. The method 100 is described herein as implemented using, for example, the wind turbines 52 of the wind farm 50 described above. However, it should be appreciated that the disclosed method 100 may be implemented using any other suitable wind turbine or wind farm now known or later developed in the art. In addition, although FIG. 5 depicts steps performed in a particular order for purposes of illustration and discussion, the methods described herein are not limited to any order or arrangement. One skilled in the art, using the disclosures provided herein, will appreciate that various steps of the methods can be omitted, rearranged, combined and/or adapted in various ways.

As shown at (102), the method 100 includes tracking, e.g. via the farm-level controller 56, operational usage for one or more auxiliary components of at least one of the wind turbines 52 in the wind farm 50 since the operational usage of the auxiliary components induces a load on the auxiliary component(s). For example, in an embodiment, the method 100 may include tracking the operational usage for the auxiliary component(s) in real-time online. More specifically, the processor 58 may be configured to determine the operational usage for the auxiliary components of the wind turbine 10. As used herein, "operational usage" generally refers to the time (e.g. as measured in the number of operating seconds, minutes, hours, or similar) that the auxiliary components have operated at various operational parameters and/or under certain conditions. Such operational parameters that may be considered or tracked may include, for example, one or more of the following: torque, load, speed, temperature, wind speed, wind direction, air density, turbulence intensity, an amount of yawing, or an amount of pitching. Thus, the processor 58 may also be configured to record and store the operational usage in the memory device 60 for later use. For example, the processor 58 may store the operational usage in one or more look-up tables (LUTs). Moreover, the operational usage may be stored in the cloud.

Thus, as shown at (104), the method 100 also includes determining, e.g. via the farm-level controller 56, a power consumption of the load induced on the auxiliary component(s) based on the operational usage. For example, in an embodiment, the processor(s) 58 may determine the power consumption of the load induced on the auxiliary component(s) by tracking rising and falling control commands sent by the farm-level controller 56 to the auxiliary component(s) and a rated power from a nameplate of the auxiliary component(s).

As shown at (106), the method 100 further includes receiving, e.g. via the farm-level controller 56, at least one additional parameter of the wind farm 50. For example, in an embodiment, the additional parameter(s) may include site location, spot price of wind energy, temperature, humidity, air pressure, wind speed, wind direction, or similar or combinations thereof. Accordingly, in an embodiment, the method 100 may include tracking the spot price of the wind energy and reducing the load of one or more of the auxiliary component(s) and/or scheduling a maintenance action when the spot price is above a predetermined threshold.

Accordingly, as shown at (108), the method 100 also includes implementing, e.g. via the farm-level controller 56, a control command for one or more of the auxiliary component(s) based on the power consumption and/or the additional parameter(s). For example, in particular embodiments, the processor(s) 38 may turn off one or more of the auxiliary component(s) for any of the plurality of wind turbines 52 not producing power. In another embodiment, for example, turning off one or more of the auxiliary component(s) for any of the plurality of wind turbines 52 not producing power may include turning off, at least, the topbox auxiliary loads for any of the plurality of wind turbines 52 not producing power, such as the yaw and/or pitch systems. By just considering the yaw and pitch systems, there is an opportunity to reduce about 45% of the entire auxiliary consumption, which is equivalent of increasing the power production of the wind turbine 10 by about 1%.

When the wind turbine(s) 52 is producing power, there are still some instances that the wind turbine(s) 52 can reduce auxiliary loads. For example, in certain embodiments, the processor(s) 58 may be configured to reduce the load induced on the auxiliary component(s) when at least one of the plurality of wind turbines is operating at rated power. More specifically, for example, when the wind turbine(s) 52 is operating at rated power, the yaw and/or pitch systems can be drastically reduced (rather than turned off). By avoiding yawing at rated power, for example, the power produced by the wind turbine(s) 52 can be increased at every wind speed. When the wind turbine(s) 52 is not operating at rated power, then the optimization can be based on temperature and/or other specific conditions for each auxiliary load.

In still another embodiment, if the load induced on the auxiliary component(s) deviates by a certain threshold, the method 100 may also include determining at least one operating condition at the deviated load, trending the operating condition(s) over time, and storing the trended operating condition(s) in a memory device(s) 60 for use in future designs of the wind farm 50.

Various aspects and embodiments of the present invention are defined by the following numbered clauses:

Clause 1. A method for optimizing auxiliary loads of a wind farm comprising a plurality of wind turbines, the method comprising:

tracking, via a farm-level controller of the wind farm, operational usage for one or more auxiliary components of at least one of the plurality of wind turbines in the wind farm, the operational usage for the one or more auxiliary components placing a load on the one or more auxiliary components;

determining, via the farm-level controller, a power consumption of the load induced on the one or more auxiliary components based on the operational usage; receiving, via the farm-level controller, at least one additional parameter of the wind farm; and, implementing, via the farm-level controller, a control command for one or more of the one or more auxiliary components based on the power consumption and the at least one additional parameter.

Clause 2. The method of clause 1, further comprising tracking the operational usage for the one or more auxiliary components in real-time online.

Clause 3. The method of any of the preceding clauses, wherein determining the power consumption of the load induced on the one or more auxiliary components based on the operational usage further comprises:

tracking rising and falling control commands sent by the farm-level controller to the one or more auxiliary components and a rated power from a nameplate of the one or more auxiliary components.

Clause 4. The method of any of the preceding clauses, wherein the at least one additional parameter comprises at least one of site location, spot price of wind energy, temperature, humidity, air pressure, wind speed, or wind direction.

Clause 5. The method of clause 4, further comprising tracking the spot price of the wind energy and reducing the load of one or more of the one or more auxiliary components or scheduling a maintenance action when the spot price is above a predetermined threshold.

Clause 6. The method of any of the preceding clauses, wherein the one or more auxiliary components comprise at least one of topbox auxiliary loads, converter auxiliary loads, or downtower auxiliary loads, the topbox auxiliary loads comprising at least one of a yaw system, a pitch system, one or more pumps, a heating system, or a cooling system.

Clause 7. The method of clause 6, wherein implementing the control command for one or more of the one or more auxiliary components based on the power consumption and the at least one additional parameter further comprises: turning off one or more of the one or more auxiliary components for any of the plurality of wind turbines not producing power.

Clause 8. The method of clause 7, wherein turning off one or more of the one or more auxiliary components for any of the plurality of wind turbines not producing power further comprises turning off at least the topbox auxiliary loads for any of the plurality of wind turbines not producing power.

Clause 9. The method of clause 6, wherein implementing the control command for one or more of the one or more auxiliary components based on the power consumption and the at least one additional parameter further comprises: reducing the load induced on the one or more auxiliary components when at least one of the plurality of wind turbines is operating at rated power.

Clause 10. The method of any of the preceding clauses, further comprising:

if the load induced on the one or more auxiliary components deviates by a certain threshold, determining at least one operating condition at the deviated load; trending the at least one operating condition over time; and, storing the trended at least one operating condition in a memory device for use in future designs of the wind farm.

Clause 11. A system for optimizing auxiliary loads of a wind turbine, the system comprising:

a controller configured to implement a plurality of operations, the plurality of operations comprising:

tracking operational usage for one or more auxiliary components of the wind turbine, the operational usage for the one or more auxiliary components placing a load on the one or more auxiliary components;

determining a power consumption of the load induced on the one or more auxiliary components based on the operational usage;

receiving at least one additional parameter of the wind turbine; and, implementing a control command for one or more of the one or more auxiliary components based on the power consumption and the at least one additional parameter.

Clause 12. The system of clause 11, wherein the plurality of operations further comprise tracking the operational usage for the one or more auxiliary components in real-time online.

Clause 13. The system of clauses 11-12, wherein determining the power consumption of the load induced on the one or more auxiliary components based on the operational usage further comprises:

tracking rising and falling control commands sent by the farm-level controller to the one or more auxiliary components and a rated power from a nameplate of the one or more auxiliary components.

Clause 14. The system of clauses 11-13, wherein the at least one additional parameter comprises at least one of site location, spot price of wind energy, temperature, humidity, air pressure, wind speed, or wind direction.

Clause 15. The system of clause 14, wherein the plurality of operations further comprise tracking the spot price of the wind energy and reducing the load of one or more of the one or more auxiliary components or scheduling a maintenance action when the spot price is above a predetermined threshold.

Clause 16. The system of clauses 11-15, wherein the one or more auxiliary components comprise at least one of topbox auxiliary loads, converter auxiliary loads, or downtower auxiliary loads, the topbox auxiliary loads comprising at least one of a yaw system, a pitch system, one or more pumps, a heating system, or a cooling system.

Clause 17. The system of clause 16, wherein implementing the control command for one or more of the one or more auxiliary components based on the power consumption and the at least one additional parameter further comprises: turning off one or more of the one or more auxiliary components for any of the plurality of wind turbines not producing power.

Clause 18. The system of clause 17, wherein turning off one or more of the one or more auxiliary components for any of the plurality of wind turbines not producing power further comprises turning off at least the topbox auxiliary loads for any of the plurality of wind turbines not producing power.

Clause 19. The system of clause 16, wherein implementing the control command for one or more of the one or more auxiliary components based on the power consumption and the at least one additional parameter further comprises: reducing the load induced on the one or more auxiliary components when at least one of the plurality of wind turbines is operating at rated power.

Clause 20. A method for optimizing power output a wind farm comprising a plurality of wind turbines, the method comprising:
tracking, via a farm-level controller of the wind farm, operational usage for one or more auxiliary components of at least one of the plurality of wind turbines in the wind farm, the operational usage for the one or more auxiliary components placing a load on the one or more auxiliary components;
determining, via the farm-level controller, a power consumption of the load induced on the one or more auxiliary components based on the operational usage; and, implementing, via the farm-level controller, a control command for one or more of the one or more auxiliary components based on the power consumption.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for optimizing auxiliary loads of a wind farm comprising a plurality of wind turbines, the method comprising:
   tracking, via a farm-level controller of the wind farm, operational usage for one or more auxiliary components of at least one of the plurality of wind turbines in the wind farm, the operational usage for the one or more auxiliary components placing a load on the one or more auxiliary components, wherein the one or more auxiliary components comprise, at least, topbox auxiliary components, the topbox auxiliary components comprising at least one of a yaw system or a pitch system and at least one of one or more pumps, a heating system, or a cooling system;
   determining, via the farm-level controller, a power consumption of the load induced on the one or more auxiliary components based on the operational usage;
   receiving, via the farm-level controller, at least one additional parameter of the wind farm; and
   turning off one or more of the topbox auxiliary components for any of the plurality of wind turbines that are not producing power based on the power consumption and the at least one additional parameter.

2. The method of claim 1, further comprising tracking the operational usage for the one or more auxiliary components in real-time online.

3. The method of claim 1, wherein determining the power consumption of the load induced on the one or more auxiliary components based on the operational usage further comprises:
   tracking rising and falling control commands sent by the farm-level controller to the one or more auxiliary components and a rated power from a nameplate of the one or more auxiliary components.

4. The method of claim 1, wherein the at least one additional parameter comprises at least one of site location, spot price of wind energy, temperature, humidity, air pressure, wind speed, or wind direction.

5. The method of claim 4, further comprising tracking the spot price of the wind energy and reducing the load of one or more of the one or more auxiliary components or scheduling a maintenance action when the spot price is above a predetermined threshold.

6. The method of claim 1, wherein the one or more auxiliary components further comprise at least one of converter auxiliary components or downtower auxiliary components.

7. The method of claim 6, wherein implementing the control command for one or more of the one or more auxiliary components based on the power consumption and the at least one additional parameter further comprises:
   reducing the load induced on the one or more auxiliary components when at least one of the plurality of wind turbines is operating at rated power.

8. The method of claim 1, further comprising:
   if the load induced on the one or more auxiliary components deviates by a certain threshold, determining at least one operating condition at the deviated load;
   trending the at least one operating condition over time; and,
   storing the trended at least one operating condition in a memory device for use in future designs of the wind farm.

9. A system for optimizing auxiliary loads of a wind turbine, the system comprising:
   a controller configured to implement a plurality of operations, the plurality of operations comprising:
      tracking operational usage for one or more auxiliary components of the wind turbine, the operational usage for the one or more auxiliary components placing a load on the one or more auxiliary components, wherein the one or more auxiliary components comprise, at least, topbox auxiliary components, the topbox auxiliary components comprising at least one of a yaw system or a pitch system and at least one of one or more pumps, a heating system, or a cooling system;

determining a power consumption of the load induced on the one or more auxiliary components based on the operational usage;

receiving at least one additional parameter of the wind turbine; and turning off one or more of the topbox auxiliary components for any of the plurality of wind turbines that are not producing power based on the power consumption and the at least one additional parameter.

10. The system of claim 9, wherein the plurality of operations further comprise tracking the operational usage for the one or more auxiliary components in real-time online.

11. The system of claim 9, wherein determining the power consumption of the load induced on the one or more auxiliary components based on the operational usage further comprises:

tracking rising and falling control commands sent by the farm-level controller to the one or more auxiliary components and a rated power from a nameplate of the one or more auxiliary components.

12. The system of claim 9, wherein the at least one additional parameter comprises at least one of site location, spot price of wind energy, temperature, humidity, air pressure, wind speed, or wind direction.

13. The system of claim 12, wherein the plurality of operations further comprise tracking the spot price of the wind energy and reducing the load of one or more of the one or more auxiliary components or scheduling a maintenance action when the spot price is above a predetermined threshold.

14. The system of claim 9, wherein the one or more auxiliary components further comprise at least one of converter auxiliary components or downtower auxiliary components.

15. The system of claim 14, wherein implementing the control command for one or more of the one or more auxiliary components based on the power consumption and the at least one additional parameter further comprises:

turning off one or more of the one or more auxiliary components of the wind turbine.

16. The system of claim 15, wherein turning off one or more of the one or more auxiliary components of the wind turbine further comprises turning off at least the topbox auxiliary components of the wind turbine.

17. The system of claim 14, wherein implementing the control command for one or more of the one or more auxiliary components based on the power consumption and the at least one additional parameter further comprises:

reducing the load induced on the one or more auxiliary components when the wind turbine is operating at rated power.

18. A method for optimizing power output a wind farm comprising a plurality of wind turbines, the method comprising:

tracking, via a farm-level controller of the wind farm, operational usage for one or more auxiliary components of at least one of the plurality of wind turbines in the wind farm, the operational usage for the one or more auxiliary components placing a load on the one or more auxiliary components, wherein the one or more auxiliary components comprise, at least, topbox auxiliary components, the topbox auxiliary components comprising at least one of a yaw system or a pitch system and at least one of one or more pumps, a heating system, or a cooling system;

determining, via the farm-level controller, a power consumption of the load induced on the one or more auxiliary components based on the operational usage; and turning, via the farm-level controller, off one or more of the topbox auxiliary components for any of the plurality of wind turbines that are not producing power based on the power consumption.

* * * * *